United States Patent
Lee et al.

(10) Patent No.: US 11,036,211 B2
(45) Date of Patent: *Jun. 15, 2021

(54) ORCHESTRATION OF LEARNING AND EXECUTION OF MODEL PREDICTIVE CONTROL TOOL FOR MANUFACTURING PROCESSES

(71) Applicant: International Business Machines Corporation, Armonk, NY (US)

(72) Inventors: Young Min Lee, Old Westbury, NY (US); Edward Pring, Yorktown Heights, NY (US); Kyong Min Yeo, Scarsdale, NY (US); Nam H Nguyen, Pleasantville, NY (US); Jayant R. Kalagnanam, Briarcliff Manor, NY (US); Christian Makaya, Summit, NJ (US); Hui Qi, Yorktown Heights, NY (US); Dhavalkumar C Patel, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 70 days.

This patent is subject to a terminal disclaimer.

(21) Appl. No.: 16/410,044

(22) Filed: May 13, 2019

(65) Prior Publication Data

US 2019/0265685 A1  Aug. 29, 2019

Related U.S. Application Data

(63) Continuation of application No. 15/716,845, filed on Sep. 27, 2017, now Pat. No. 10,394,229.

(51) Int. Cl.
*G05B 19/418* (2006.01)
*G06N 5/04* (2006.01)
(Continued)

(52) U.S. Cl.
CPC ......... *G05B 19/41865* (2013.01); *G06N 5/04* (2013.01); *G06N 20/00* (2019.01); *G06N 20/20* (2019.01); *G05B 2219/32281* (2013.01)

(58) Field of Classification Search
CPC .... G05B 19/41865; G05B 2219/32281; G06N 5/04; G06N 20/00
See application file for complete search history.

(56) References Cited

U.S. PATENT DOCUMENTS 8,725,510 B2   5/2014   Yoshiike et al.
9,202,281 B2   12/2015  Wang et al.
(Continued)

OTHER PUBLICATIONS

Grimble, M.J., "LQG Optimization of PID Structured Multi-Model Process Control Systems: One DOF Tracking and Feedforward Control", Dynamics and Control, Apr. 2001, vol. 11, Issue 2, pp. 103-132.

(Continued)

*Primary Examiner* — Vincent H Tran
(74) *Attorney, Agent, or Firm* — Scully, Scott, Murphy & Presser, P C.; Daniel P. Morris

(57) ABSTRACT

Based on at least one manufacturing process characteristics associated with a manufacturing process, a prediction time at which to execute a selected machine learning model selected from multiple trained machine learning models is determined, and at the prediction time, the selected machine learning model is executed. Executing the selected machine learning model predicts a control set point for future values of state variables of the manufacturing process, for controlling the manufacturing process. Based on at least one of the manufacturing process characteristics, a learning time at which to train a machine learning model is determined, and at the learning time, the machine learning model is trained based on historical process data associated with the manufacturing process.

20 Claims, 5 Drawing Sheets

(51) Int. Cl.
*G06N 20/00* (2019.01)
*G06N 20/20* (2019.01)

(56) References Cited

U.S. PATENT DOCUMENTS

| | | | |
|---|---|---|---|
| 10,394,229 B2* | 8/2019 | Lee | G05B 19/41865 |
| 10,656,631 B2* | 5/2020 | Lee | G06N 20/00 |
| 2005/0288893 A1 | 12/2005 | Gassner | |
| 2007/0238204 A1* | 10/2007 | Kurihara | H01L 22/20 |
| | | | 438/14 |
| 2010/0088076 A1 | 4/2010 | Koutsabeloulis et al. | |
| 2011/0060443 A1 | 3/2011 | Schwarm | |
| 2011/0320026 A1* | 12/2011 | Chen | G05B 19/41875 |
| | | | 700/104 |
| 2013/0262457 A1 | 10/2013 | Lian et al. | |
| 2014/0052425 A1* | 2/2014 | Selvaraj | G06N 7/02 |
| | | | 703/6 |
| 2014/0358480 A1 | 12/2014 | Raquel et al. | |
| 2016/0307145 A1 | 10/2016 | Banerjee et al. | |
| 2016/0342626 A1 | 11/2016 | Li et al. | |
| 2017/0001872 A1 | 1/2017 | Schmidt et al. | |
| 2017/0323216 A1* | 11/2017 | Fano | G06Q 10/067 |
| 2018/0322234 A1* | 11/2018 | Cao | G06F 30/39 |
| 2019/0094842 A1 | 3/2019 | Lee | |

OTHER PUBLICATIONS

Wang, D., et al., "An Approach for Designing Highly Adaptable Process-Control Systems", Proceedings of the Eigth International Symposium on Object-Oriented Real-Time Distributed Computing (ISORC'05), May 18-May 20, 2005, 8 pages.

Hayden, E., et al., "An Abbreviated History of Automation & Industrial Controls Systems and Cybersecurity", A SANS Analyst Whitepaper, Aug. 2014, pp. 1-32.

Hong, S.H., et al., "Analysis of Real-Time Data Transmission in the DLL of IEC/ISA Fieldbus", Proceedings of the IEEE International Symposium on Industrial Electronics (ISIE'98), pp. 694-699, vol. 2.

Hung, J.Y., et al., "Variable Structure Control: A survey", IEEE Transactions on Industrial Electronics, Feb. 1993, pp. 2-22, vol. 40, No. 1.

List of IBM Patents or Patent Applications Treated as Related, dated May 13, 2019, 2 pages.

Office Action dated Aug. 23, 2019 received in U.S. Appl. No. 15/812,285, 19 pages.

* cited by examiner

ORCHESTRATION OF LEARNING AND EXECUTION OF MODEL PREDICTIVE CONTROL TOOL FOR MANUFACTURING PROCESSES

FIELD

The present application relates generally to computers and computer applications, and more particularly to learning and execution of model predictive control for a manufacturing process.

BACKGROUND

In manufacturing, data-driven predictive models may be generated to make process control decisions from real-time IoT (Internet of Things) data. IoT is a technological foundation for connectivity and messaging of sensor data from sensors, devices, equipment and unit operations (stages) in homes, buildings, factories, manufacturing production processes, cars and other connected objects.

BRIEF SUMMARY

A system and method of controlling a manufacturing process may be provided. The system, in one aspect, may include at least one first hardware processor. At least one first hardware processor may be communicatively coupled to a control system that actuates actions to control the manufacturing process. At least one first hardware processor may be operable to receive manufacturing process characteristics associated with the manufacturing process. At least one first hardware processor may be operable to, based on at least one of the manufacturing process characteristics, determine a prediction time at which to execute a selected machine learning model selected from multiple trained machine learning models, and at the prediction time, execute the selected machine learning model based on process data associated with the manufacturing process. Executing of the selected machine learning model predicts a control set point for future values of state variables of the manufacturing process. The control set point may be sent to the control system to control the manufacturing process by adjusting to the control set point.

A method of controlling a manufacturing process, in one aspect, may include receiving manufacturing process characteristics associated with the manufacturing process. The method may also include, based on at least one of the manufacturing process characteristics, determining a prediction time at which to execute a selected machine learning model selected from multiple trained machine learning models, and at the prediction time, executing the selected machine learning model based on process data associated with the manufacturing process, the executing of the selected machine learning model predicting a control set point for future values of state variables of the manufacturing process. The method may also include sending the control set point to a control system to control the manufacturing process by adjusting to the control set point.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques are disclosed for an intelligent plant advisory system that may adaptively generate predictive models and execute an appropriate predictive model in real time to predict future state of the process and compute a control set point for controlling a manufacturing process. In one embodiment, a system and method may ingest manufacturing process data in real time and continuously learn via orchestration a causal relationship between a time series of process variables and states of the manufacturing process as needed, continuously predict future states of the manufacturing process and compute control set point via orchestration. An example of the manufacturing process includes a blast furnace operation in steel manufacturing process.

In one embodiment, a model training and retraining are performed based on one or more manufacturing characteristics. Examples of manufacturing characteristics include, but are not limited to, one or more manufacturing process conditions such as high production rate and batch size, a raw material grade, a product grade, one or more quality measurement events such as measurement frequencies, one or more target variable types such as a temperature of a product exiting from the process and a chemical composition of a product, and other manufacturing process characteristics.

In one embodiment, a model predictive control (MPC) system architecture and apparatus for orchestrating continuous learning (training) and real-time execution (prediction) of machine learning or deep learning prediction model using process characteristics data for manufacturing process are provided.

The system, method and techniques in one embodiment provide for improvement in a manufacturing process, for instance, by generating process control decisions with which the manufacturing process is controlled and/or actuated.

Figure 1:
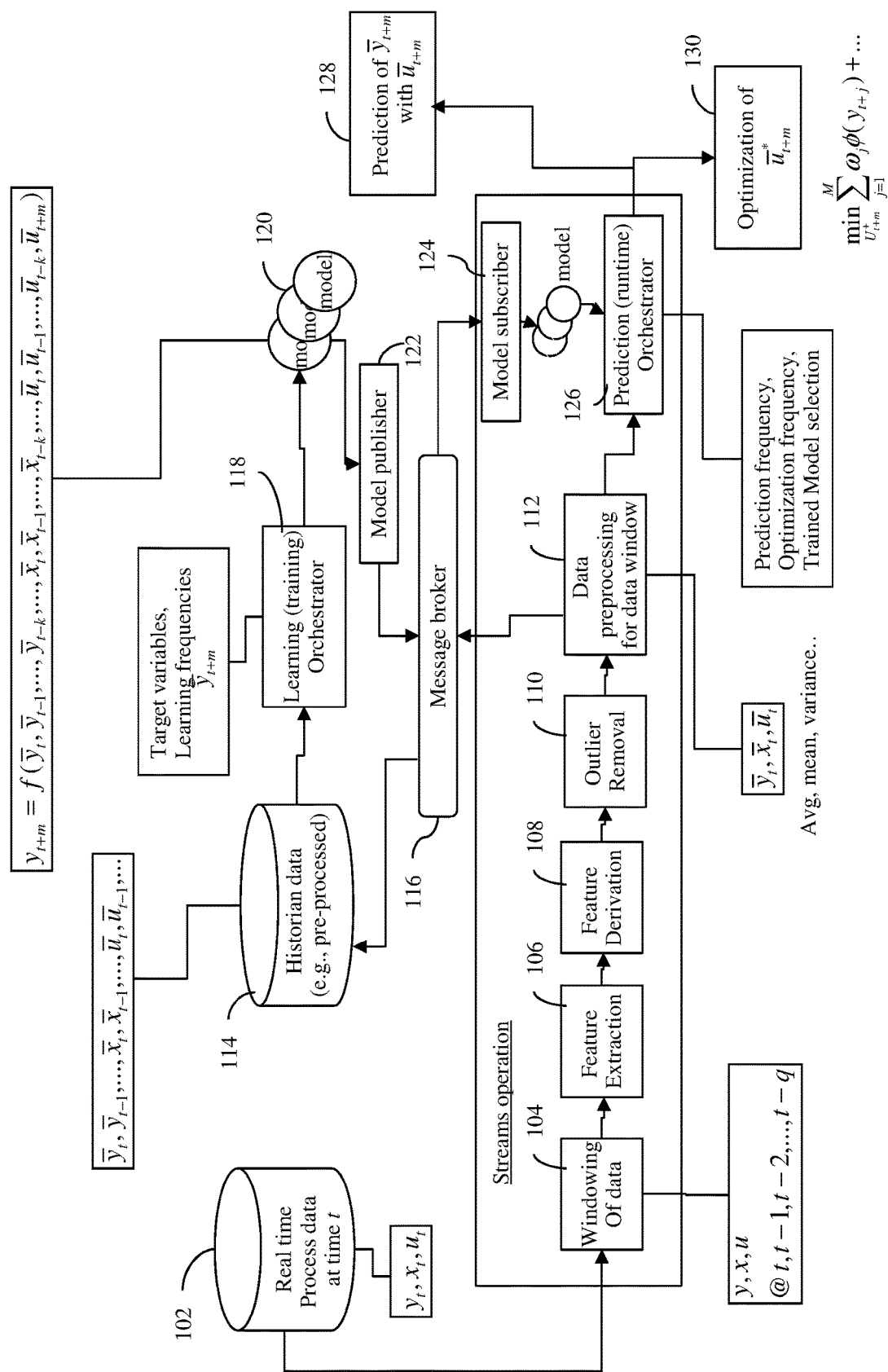
FIG. 1 is a diagram illustrating system components in one embodiment.

FIG. 1 is a diagram illustrating system components in one embodiment. The system components and functions may be implemented and executed on one or more hardware processors. Real-time process data 102 may include data measured by sensors during a manufacturing operation, in real time, for example, blast furnace operation in steel manufacturing. For instance, sensors may be coupled to, or mounted on, the wall of the blast furnace, and may provide real time measurements of the conditions of the blast furnace during operation, such as the temperature and pressure, other state variables in the manufacturing process, controllable or control variables such as a charge or dumping rate of input material, for example, iron ore and coke, flow rate of blast air, moisture content of blast air, oxygen enrichment amount of blast air, and flow rate of pulverized coal. In the figure, example notation y may represent target variable(s), x may represent state variable(s) and u may represent control variable(s).

A windowing of data component 104 receives the real time process data 102, and groups the real time data into a time window. For instance, a group of data includes real time data from time t to time t-q, where q is a time interval. The real time data may include variables such as temperature, pressure at different locations in the manufacturing process or operation, composition of raw material entering the manufacturing process. Feature extraction component 106 selects a subset of variables in the group of data that impact the states of the manufacturing operation. For example, feature extraction component 106 may remove from the group variables that are not of interest, for instance, temperature and variables from certain locations of the manufacturing process. Selection may be done based on one or more rules or algorithms implemented based on expert knowledge. Feature derivation component 108 derives additional variables related to the real time data in the group of data. Feature derivation may be achieved based on one or more rules or algorithms implemented based on expert knowledge. An example feature that is derived may include, but is not limited to, a standard deviation of a subset of the variables. Outlier removal component 110 removes data that is determined to be an outlier. For instance, variable data that is outside of a 2 or 3 standard deviation may be removed.

Data preprocessing for data window component 112 may preprocess the group of real time data, for example, determine the average value of each variable in the group, the mean of each variable in the group, and the variance of each variable in the group.

The pre-processed data at 112 is sent to a storage device storing a database of historian data 114, for example, via a message broker 116, which communicates data between processing components. The historian data database 114 stores past process data, for example, pre-processed data.

Learning (or training) orchestrator component 118 determines the time to train a machine learning model based on the pre-processed data stored in the historian data database 114. For example, the learning orchestrator 118 may periodically inspect the historian data 114 and responsive to recognizing a pattern in the historian data 114, triggers learning or training of a machine learning model. Pattern recognition may be based on one or more rules or algorithms. A rule may specify to inspect the data from the current time to a specified past time, and determine whether a criterion is met. For instance, the learning orchestrator 118 determines a learning frequency or time for a variable, for each of different variables. For example, the learning orchestrator 118 may determine that a model that predicts variable y should be run every 2 hour. As another example, the learning orchestrator 118 may determine that a model that predicts variable y should be run at 9 o'clock. At the determined frequency or time, the learning orchestrator 118 trains a model, generating a trained machine learning model 120. In this way, multiple trained machine learning models are generated.

Model publisher component 122 generates or updates a catalogue that includes a list of trained machine learning models and their attributes. The catalog is sent to a model subscriber component 124, for instance, via the message broker 116. The model subscriber component 124 receives and holds the catalogue of models.

Based on the catalogue, prediction orchestrator component 126 selects a trained machine learning model to execute, and also determines when (e.g., the frequency or time) to execute the selected trained machine learning model, and/or when to execute an optimization of the selected trained machine learning model. Based on the determined time or frequency, the trained machine learning model may be executed (e.g., 128), and/or optimized (e.g., 130).

Executing and/or optimizing of the selected trained machine learning model determines or predicts control set point or points, which may be sent to a control system for controlling the manufacturing process.

Figure 2:
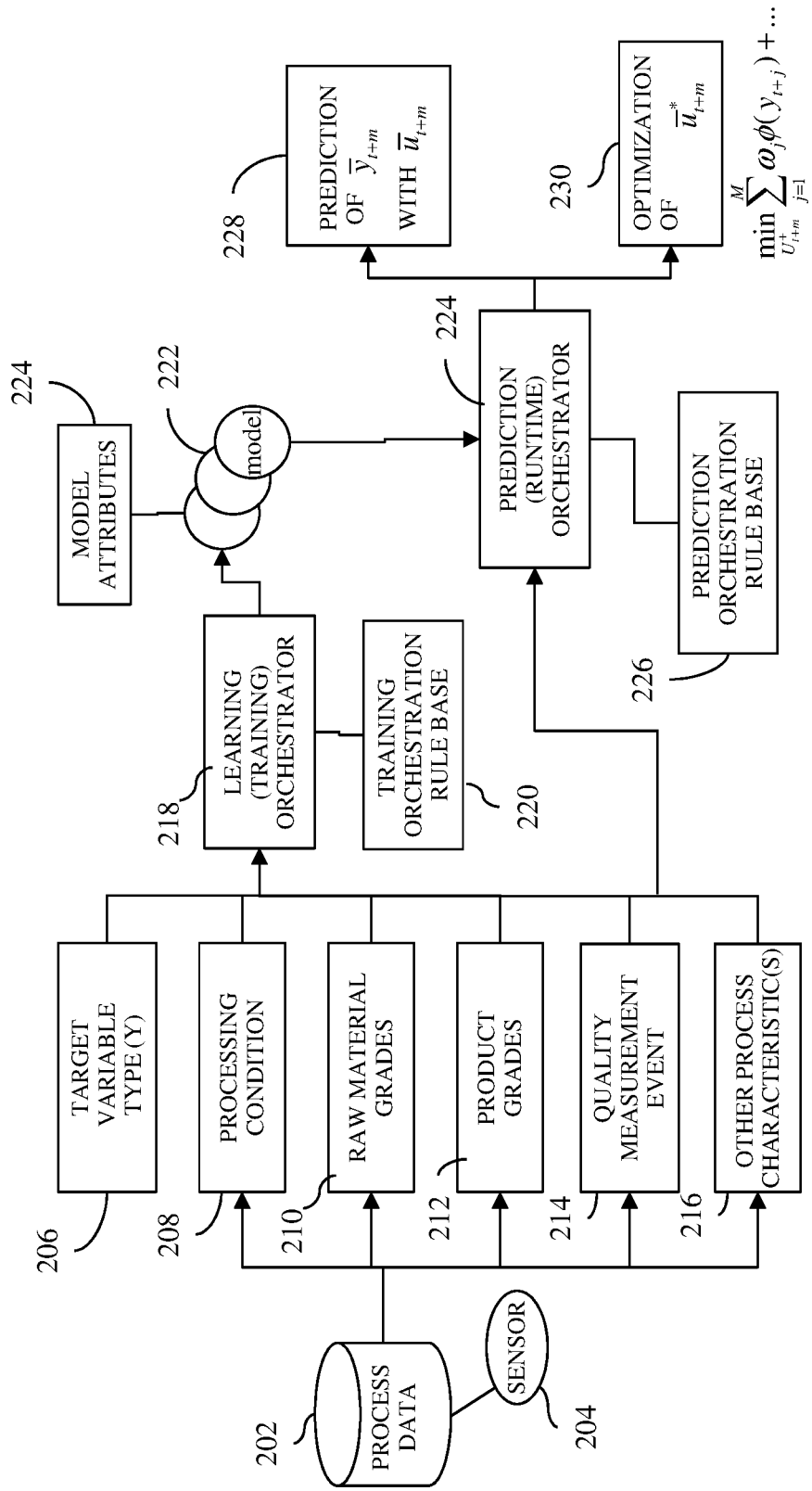
FIG. 2 is a diagram illustrating learning and prediction orchestration for controlling a manufacturing process in one embodiment.

FIG. 2 illustrates learning and prediction orchestration for controlling a manufacturing process in one embodiment. Manufacturing process data 202 (e.g., data associated with manufacturing operation in producing a product) may be received from one or more sensors 204 and stored, for example, on a memory or storage device. Manufacturing process data 202 may include data indicative of manufacturing process characteristics. Manufacturing process characteristics may include data associated with target variable type 206, processing condition 208, raw material grade 210, product grade 212, quality measurement event 214 and one or more other process characteristics 216.

One or more hardware processors may be coupled to one or more storage devices and perform learning orchestration 218. For example, the learning orchestration 218 includes, based on at least one of the manufacturing process characteristics (e.g., 206, 208, 210, 212, 214, 216), determining a learning time at which to train a machine learning model, and at the learning time, training the machine learning model based on historical process data associated with the manufacturing process. In one embodiment, the learning time at which to train a machine learning model is determined based on one or more training orchestration rules or criteria 220, for example, stored on a storage device. Based on at least one of the manufacturing process characteristics meeting a criterion or a rule, the rule may be triggered to train a machine learning model at a specified time. An example of the training orchestration rules may be: If a high grade product is produced with raw materials from a mine in X geographic location, the training of Silicone content prediction model has to be every 1000 tons produced. Another example may be: If a measurement interval of hot metal temperature (HMT) in a blast furnace is irregular, train the HMT prediction model N minutes (e.g., 5 minutes) after each measurement of hot metal temperature. The trained machine learning model 222 is stored on a storage or memory device. Model attributes 224 of the trained machine learning model 22 are also extracted and stored, for example, as part of a catalogue of models. The model attributes describe a trained machine learning model. For example, the model attributes may include the response variable, time of training, time taken for the training, production line number, process number, product grade, raw material grades, and/or other attributes.

The manufacturing process continues and one or more hardware processors continues to receive additional (e.g., new) manufacturing process characteristics (e.g., 206, 208, 210, 212, 214, 216). Based on the additional or new manufacturing process characteristics received, one or more hardware processors repeats determining of the learning time and training of the machine learning model at the learning time. In this way, multiple trained machine learning models 222 are generated and stored on a storage or memory device.

One or more hardware processors performing prediction orchestration 226 receives the manufacturing process characteristics (e.g., 206, 208, 210, 212, 214 and 216), for example, in real time, and determines a prediction time at which to execute a selected machine learning model selected from the multiple trained machine learning models 222, and at the prediction time, executes the selected machine learning model based on process data associated with the manufacturing process. The prediction time may be determined based on at least one of the manufacturing process characteristics meeting a rule condition or criterion. For example, in one embodiment, the prediction time at which to execute the selected machine learning model is determined based on one or more prediction orchestration rules or criteria 226, for example, stored on a storage device. Based on at least one of the manufacturing process characteristics meeting a criterion or a rule, the rule may be triggered to execute a selected machine learning model at a specified time. The prediction orchestration rule database 226 may also store rules for selecting a machine learning model to execute. Based on at least one of the received manufacturing characteristics (e.g., real-time data), a trained machine learning model may be selected from a plurality of trained models (e.g., 222). An example of a rule may be: For predicting hot metal temperature of blast furnace, if the current season is summer time, select a blast furnace hot metal temperature prediction model that was trained during the summer time, execute the prediction model every 20 minutes for the next 1 hour into the future. Another example of a rule may be: If the current manufacturing process is producing a low grade product, select a prediction model that was trained during the manufacturing process when low grade product was produced, and execute the prediction model every 2 hours.

The executing of the selected machine learning model predicts a control set point or a set of control set points for future values of state variables in the manufacturing process, for example, as shown at 228 and 210. For instance, a selected machine learning model may be a prediction model 228. Another example of a selected machine learning model may be an optimization model 230. One or more hardware processors may send the control set point or the set of control set points to a control system to control the manufacturing process by automatically adjusting the parameters of the manufacturing processor according to the control set point.

One or more hardware processors orchestrating the predicting may be referred to as one or more first hardware processors. One or more hardware processors orchestrating the learning may be referred to as one or more second hardware processors. The manufacturing process may be a continuous manufacturing process, for example, a continuous blast furnace operation in steel manufacturing. In one embodiment, the manufacturing process characteristics are received in real time. A catalogue of the multiple trained machine learning models may be communicated to at least one first hardware processor, and at least one first hardware processor may pull a set of the multiple trained machine learning models from the storage device.

Figure 3:
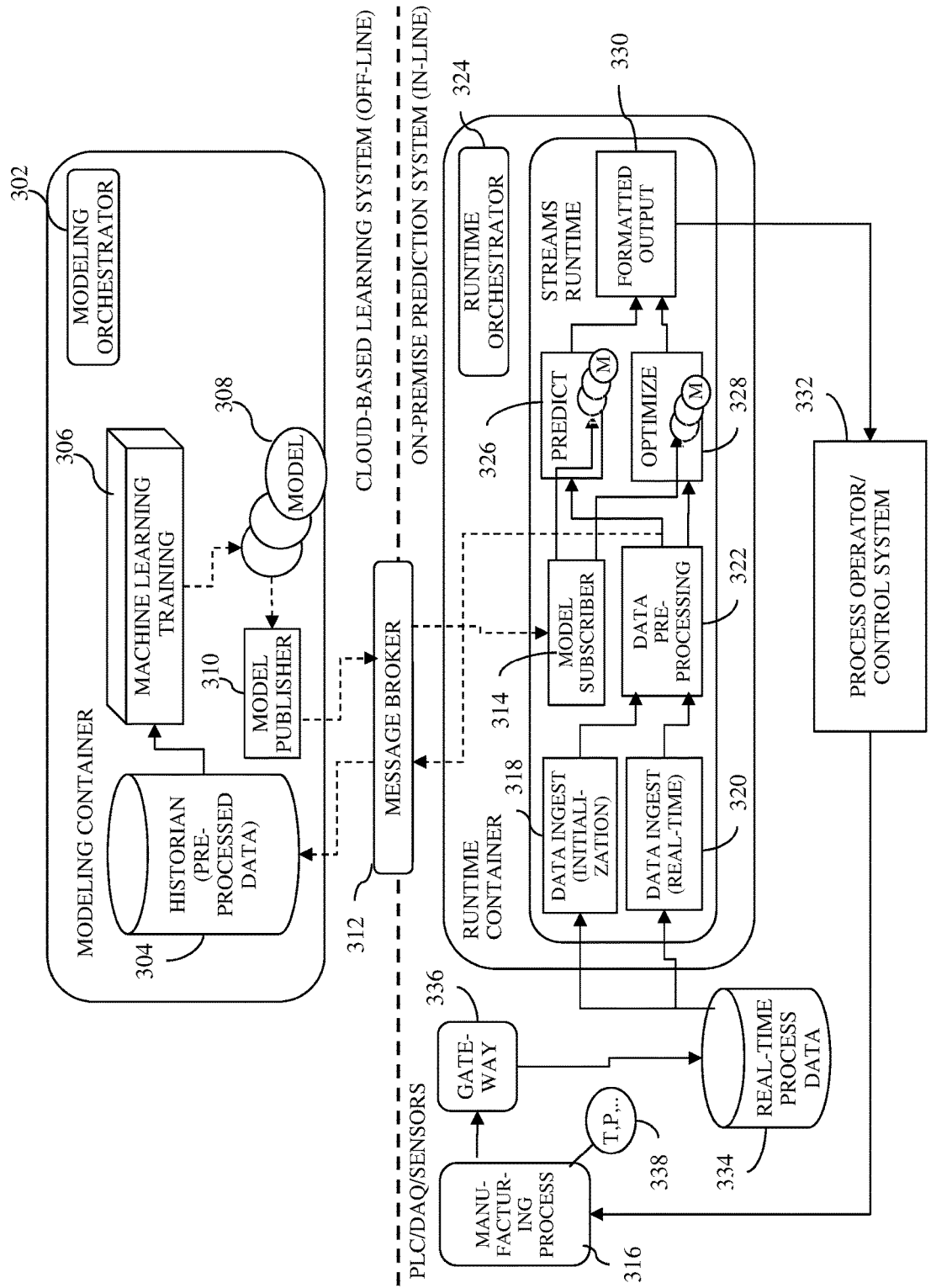
FIG. 3 is another diagram illustrating system components in one embodiment.

FIG. 3 is another diagram illustrating system components in one embodiment. A modeling orchestrator 302 may include one or more hardware processors that determine a time for training (or retraining) a model. One or more hardware processors may pull or retrieve a set of process historian data 304 (e.g., stored on a storage device or memory device) to train a model, and at the determined time, may perform machine learning training 306. The machine learning training 306 generates a trained model 308. Information associated with the trained model 308 is published as shown at 310. The modeling orchestrator 302 repeats the process of determining the time, and training a model, based on real time received process data, creating multiple trained (or learned) models 308. Each of the trained or newly trained models may be stored on a storage device, and may be catalogued with associated attributes. For instance, one or more hardware processors may perform a model publisher process or function 310, publishing a catalogue or a list of the trained models with associated attributes.

The model publisher process 310 (e.g., a hardware processor executing the model publisher function) communicates the catalogue comprising the list of the trained models with associated attributes to a message broker function 312 (e.g., a hardware processor executing a message broker function). The communication of the catalogue may be performed periodically and/or responsive to an update to the catalogue.

The message broker function 312 (e.g., a hardware processor executing a message broker function) sends the catalogue of the list of trained machine learning models to a model subscriber function 314 (e.g., a hardware processor executing a model subscriber function). The message broker function 312 also receives data associated with a manufacturing process 316, e.g., data resulting from streams operation of data ingestion 318, 320 and pre-processing of real-time processed data 322 to a process historian database 304.

A manufacturing process 316 may have sensors 338 coupled to the process that measure or sense process data associated with the manufacturing process. Programmable logic controller (PLC), Data Acquisition system (DAS), and/or sensors may collect process data during the manufacturing product operation 316. A gateway 336, for example, one or more hardware processors, receives the data (e.g., measured data) in real time and stores the real-time process data 334 on a storage device. For example, a blast furnace in steel manufacturing may include a number of sensors (e.g., temperature sensor, pressure sensor) mounted on the wall of the blast furnace. The sensors measure blast furnace operation data (e.g., operating temperature and pressure) in real time, which are stored in a database.

A runtime orchestrator 324 may include one or more hardware processors that perform runtime orchestration functions or processes. For example, a model subscriber function 314 pulls or receives newly trained machine learning models via the message broker 312 for performing real-time prediction (e.g., 326, 328) and control action computation 330. A hardware processor performing a runtime orchestrator function 324 may determine a time for new prediction and/or optimization, select a trained machine learning model, and make the new prediction (e.g., future values of state variables and control set point(s)) by executing the selected trained machine learning model, for example, as shown at 326 and 328. For instance, a prediction model may be selected and executed as shown at 326, at the determined time. As another example, an optimization model may be selected and executed as shown at 328, at the determined time.

Prediction 326 and optimization 328 are performed based on the real-time process data 334 that is ingested at 318 and 320, and pre-processed at 322. Data initialization starts after a production is in full scale (e.g., production is stabilized after a restart) so that data are ingested for model learning and prediction. For example, for a process, production may be stabilized 10 hour after a start up. Data ingestion refers to a continuous pulling of data from the data repository of real-time process data (320) in determined frequency. In one embodiment, determining of the prediction time and selecting of a trained model to execute are performed based on one or more manufacturing process characteristics retrieved from the pre-processed data 322. In one embodiment, determining the time to train a model (e.g., in modeling orchestrator 302) is performed based on one or more manufacturing process characteristics retrieved from the pre-processed data 322 received via the message broker 312.

The result of the prediction or optimization includes one or more control set points, which are sent to a control system 332. The control system 332 actuates or controls a manufacturing process 316 by performing control action(s) or adjusting the manufacturing process 316 according to the result of the prediction. Performing control action(s) or adjusting the manufacturing process 316 according to the result of the prediction in turn updates processing conditions of the manufacturing process 316, which in turn produces new process data.

In one embodiment, the modeling orchestration may be performed on cloud-based learning system, for example, off-line. In one embodiment, the runtime orchestration may be performed on premise, for example, in-line.

Figure 4:
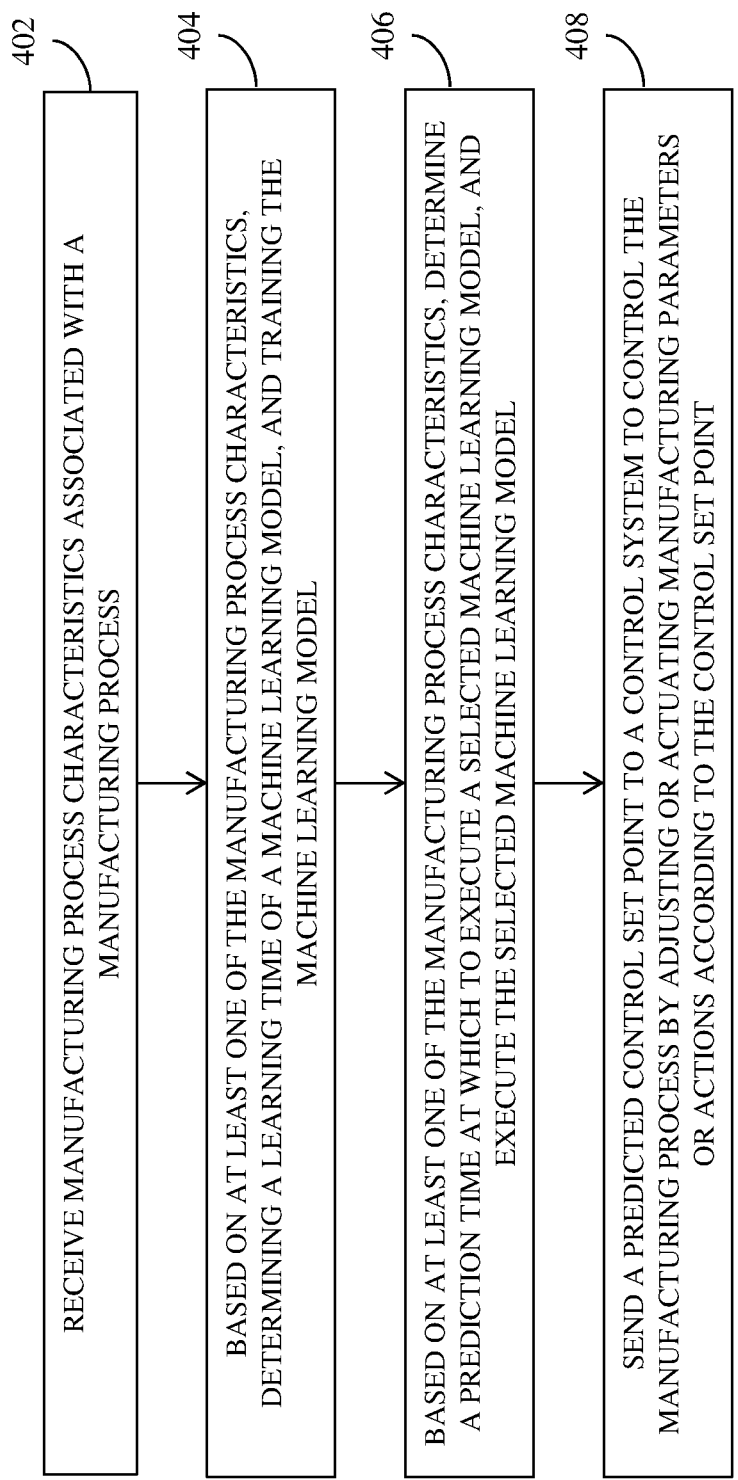
FIG. 4 is a flow diagram illustrating a method of orchestrating learning and predicting for controlling a manufacturing process in one embodiment.

FIG. 4 is a flow diagram illustrating a method in one embodiment. The method may be performed or executed by one or more hardware or computer processors. At 402, manufacturing process characteristics associated with a manufacturing process are received. In one embodiment, the manufacturing process characteristics are received in real time. Examples of the manufacturing process characteristics may include, but are not limited to, a processing condition, a raw material grade, a product grade, and a quality measurement event. The manufacturing process may be a continuous manufacturing process. An example of the manufacturing process includes a blast furnace operation in steel manufacturing.

At 404, based on at least one of the manufacturing process characteristics, a learning time at which to train a machine learning model is learned, and at the learning time, the machine learning model is trained based on historical process data associated with the manufacturing process. The learning time may be determined based on the at least one of the manufacturing process characteristics meeting at least one criterion or a rule. The manufacturing process continues and additional or new manufacturing process characteristics are received, and determining of the learning time and training of the machine learning model repeat based on the additional or new manufacturing process characteristics. In this way, multiple trained machine learning models are generated and stored on a storage device.

At 406, based on at least one of the manufacturing process characteristics, a prediction time at which to execute a selected machine learning model selected from multiple trained machine learning models is determined, and at the prediction time, the selected machine learning model is executed based on process data associated with the manufacturing process. The execution or prediction time may be determined based on the at least one of the manufacturing process characteristics meeting at least one criterion or a rule. One or more rules may also be run to determine the selected machine learning model, for example, to select a machine learning model from a plurality of trained machine learning models. In one embodiment, one or more rules may simultaneously determine which of the trained machine learning models to select and at what time to execute the selected machine learning model. Execution of the selected machine learning model predicts a control set point for future values of state variables of the manufacturing process.

At 408 the control set point to a control system to control the manufacturing process by adjusting to the control set point. For instance, the control system may autonomously actuate an action or adjust a manufacturing process parameter to control the manufacturing process in real-time based on the real-time based model prediction.

Figure 5:
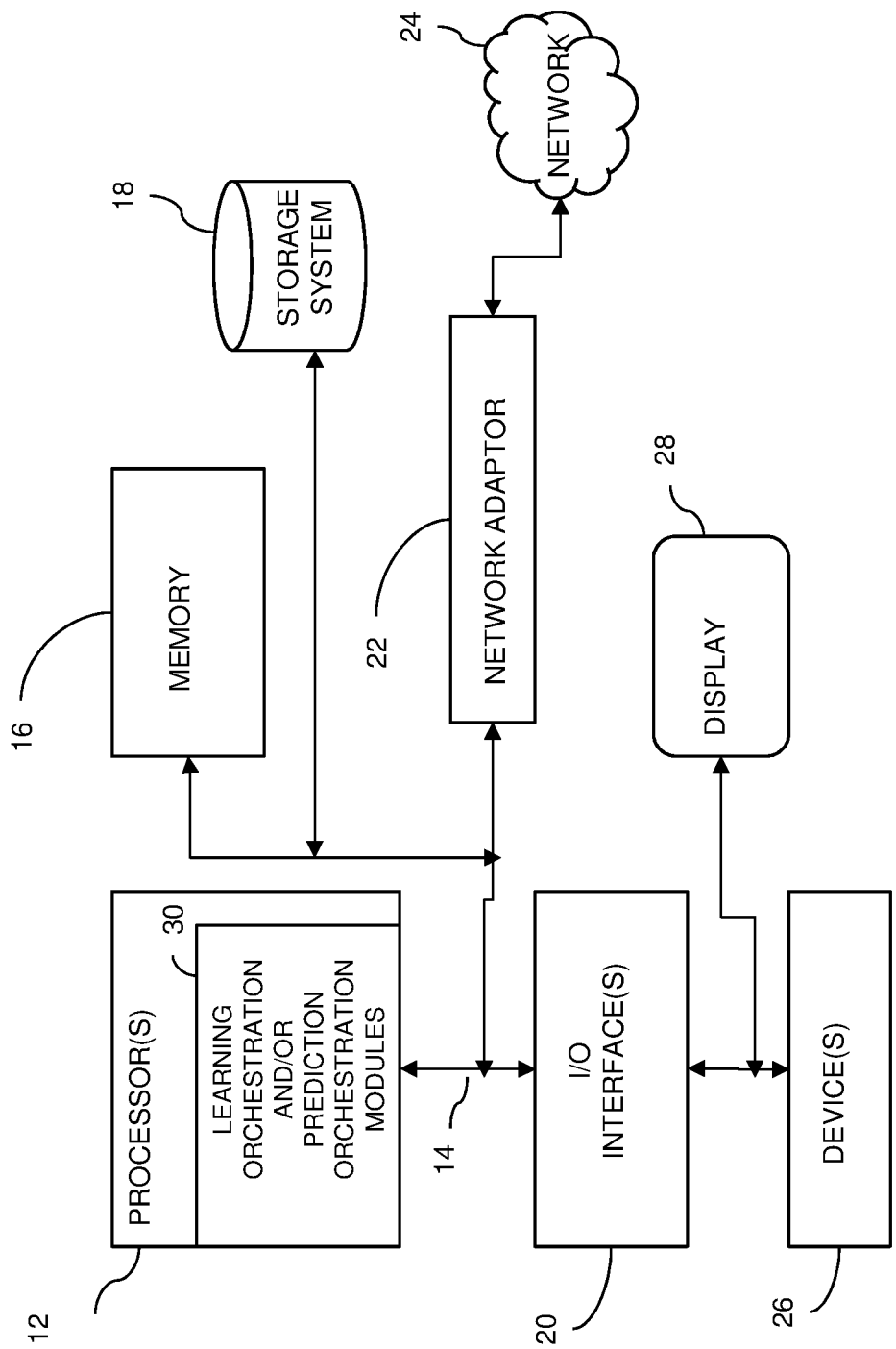
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system comprising:
a storage device;
a hardware processor operatively coupled to the storage device, the hardware processor operable to perform at least:
based on a manufacturing process characteristic of a manufacturing process, determining a learning time at which to train a machine learning model, and at the learning time, training the machine learning model based on historical process data associated with the manufacturing process, wherein as the manufacturing process continues and an additional manufacturing process characteristic is received, the determining of the learning time and the training of the machine learning model repeat, wherein multiple trained machine learning models are generated and stored on the at least one storage device.

2. The system of claim 1, wherein the learning time is determined based on the manufacturing process characteristic meeting a criterion.

3. The system of claim 1, wherein the manufacturing process is a continuous manufacturing process.

4. The system of claim 1, wherein the manufacturing process includes a blast furnace operation in steel manufacturing.

5. The system of claim 1, wherein the manufacturing process characteristic includes at least a processing condition.

6. The system of claim 1, wherein the manufacturing process characteristic includes at least a raw material grade.

7. The system of claim 1, wherein the manufacturing process characteristic includes at least a product grade.

8. The system of claim 1, wherein the manufacturing process characteristic includes at least a quality measurement event.

9. The system of claim 1, wherein the manufacturing process characteristic is received in real time.

10. A computer program product comprising a computer readable storage medium having program instructions embodied therewith, the program instructions executable by a device to cause the device to:
based on a manufacturing process characteristic of a manufacturing process, determine a learning time at which to train a machine learning model, and at the learning time, train the machine learning model based at least on historical process data associated with the manufacturing process, wherein as the manufacturing process continues and an additional manufacturing process characteristic is received, the device is further caused to repeat determining of the learning time and training of the machine learning model, wherein multiple trained machine learning models are generated.

11. The computer program product of claim 10, wherein the learning time is determined based on the manufacturing process characteristic meeting a criterion.

12. The computer program product of claim 10, wherein the manufacturing process is a continuous manufacturing process.

13. The computer program product of claim 10, wherein the manufacturing process includes a blast furnace operation in steel manufacturing.

14. The computer program product of claim 10, wherein the manufacturing process characteristic includes at least a processing condition.

15. The computer program product of claim 10, wherein the manufacturing process characteristic includes at least a raw material grade.

16. The computer program product of claim 10, wherein the manufacturing process characteristic includes at least a product grade.

17. The computer program product of claim 10, wherein the manufacturing process characteristic includes at least a quality measurement event.

18. The computer program product of claim 10, wherein the manufacturing process characteristic is received in real time.

19. The computer program product of claim 10, wherein the historical process data associated with the manufacturing process is updated as the manufacturing process continues and additional data associated with the manufacturing process is generated.

20. A system for controlling a manufacturing process, comprising:
a hardware processor;

the hardware processor communicatively coupled to a control system that actuates actions to control the manufacturing process, and operable to perform at least:

based on a manufacturing process characteristic associated with the manufacturing process, determining a prediction time at which to execute a selected machine learning model selected from multiple trained machine learning models, and at the prediction time, executing the selected machine learning model based on process data associated with the manufacturing process, the executing of the selected machine learning model predicting a control set point for a future value of a state variable of the manufacturing process; and communicating the control set point to the control system to control the manufacturing process by adjusting to the control set point.

* * * * *